United States Patent [19]

Weaver

[11] Patent Number: 4,644,985
[45] Date of Patent: Feb. 24, 1987

[54] TEMPLATE AND WORKPIECE HOLDER

[75] Inventor: Richard A. Weaver, Kansas City, Kans.

[73] Assignee: L. A. Weaver Co., Inc., Kansas City, Kans.

[21] Appl. No.: 667,852

[22] Filed: Nov. 2, 1984

[51] Int. Cl.$^4$ ............................................. B27C 1/12
[52] U.S. Cl. ...................... 144/145 R; 144/144.5 R; 144/145 A; 269/227; 409/130
[58] Field of Search ............ 144/144.5, 145 R, 145 A, 144/137, 372; 409/79, 130, 125; 269/227, 228, 93

[56] References Cited

U.S. PATENT DOCUMENTS

| | | | |
|---|---|---|---|
| 1,346,196 | 1/1921 | Heath | 144/145 A |
| 1,728,030 | 9/1929 | Bielski | 144/145 A |
| 2,142,863 | 1/1939 | Whitney | 144/145 A |
| 2,507,982 | 5/1950 | Krause | 144/145 A |
| 2,676,659 | 4/1954 | Emmer | 269/227 |
| 3,473,580 | 10/1969 | Dunn et al. | 144/145 R |
| 3,540,130 | 11/1970 | French | 144/144.5 |
| 3,739,826 | 6/1973 | Schell | 144/145 R |
| 3,771,781 | 11/1973 | Lackey et al. | 269/227 |
| 3,818,647 | 8/1974 | Vragov et al. | 144/145 A |
| 3,838,623 | 10/1974 | Schell | 144/145 A |
| 3,880,048 | 4/1975 | Zimmerman | 144/145 A |
| 4,335,873 | 6/1982 | Kiefer | 269/228 |

Primary Examiner—W. D. Bray
Attorney, Agent, or Firm—Litman, Day & McMahon

[57] ABSTRACT

A template and workpiece holder including template and workpiece centering mechanisms. The workpiece centering mechanism includes a rack and pinion gear arrangement. Toggle clamps are provided for clamping the holder, template and workpiece assemblage together. The holder includes handles for grasping by an operator for guiding the assemblage through a router, shaper or the like.

16 Claims, 13 Drawing Figures

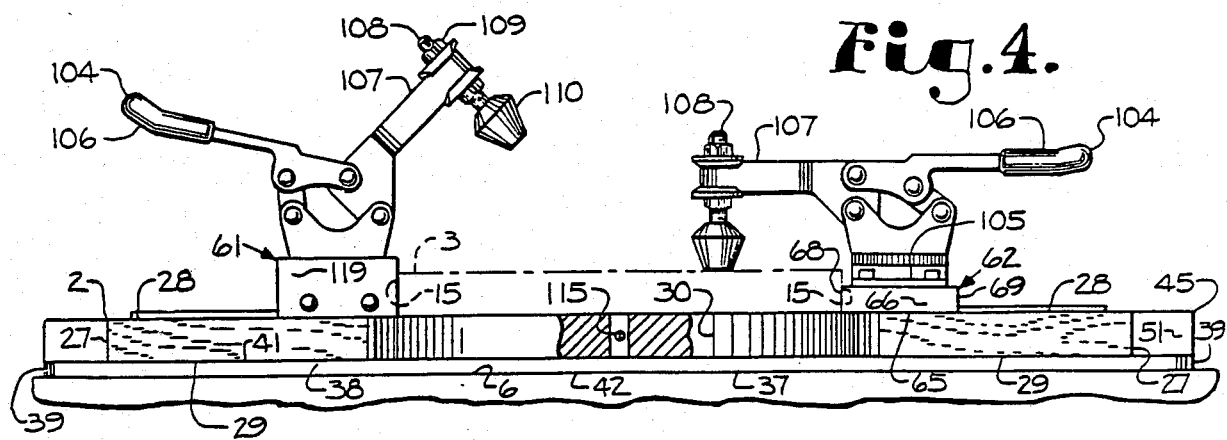
Fig. 4.
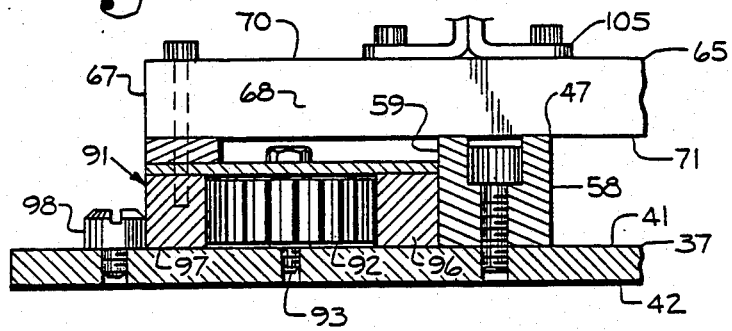
Fig. 5.
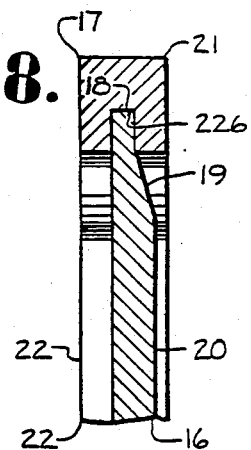
Fig. 8.
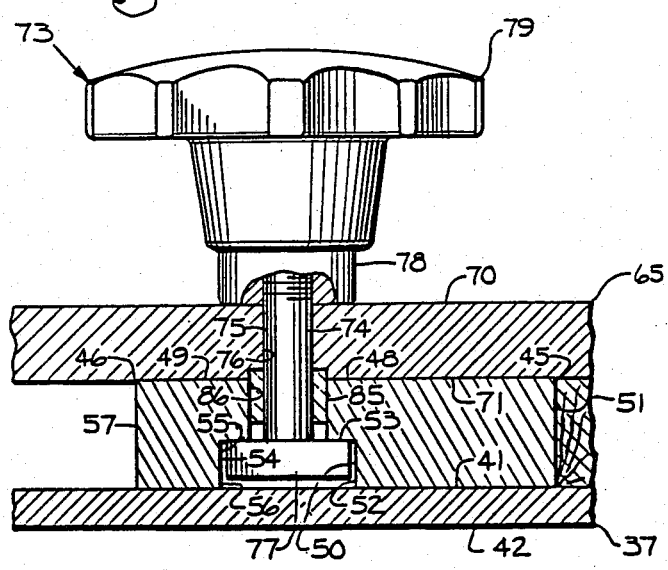
Fig. 6.
Fig. 7.

TEMPLATE AND WORKPIECE HOLDER

BACKGROUND OF THE INVENTION

1. Field of the Invention

This invention relates to a template and workpiece holder, and in particular to a holder system for use in the production of raised panel cabinet doors and drawer fronts.

2. Description of the Prior Art

In manufacturing operations where multiple workpieces are formed with identical configurations, templates embodying predetermined patterns are often employed for guiding cutting tools and the like through the workpieces. Once such manufacturing operation involves the use of a router or shaper for finishing the edges of the workpieces. Routers and shapers are high-speed, rotary cutting tools and may be fitted with a variety of blade configurations for forming dados, slots, bevels, radiuses and the like in the edges of the workpieces.

A variety of devices have been proposed for locating templates and workpieces in predetermined positions with respect to each other for routing and shaping. For example, the Schell U.S. Pat. No. 3,838,623 discloses a remote tracing device with a template mounted on one end for engagement by a follower and a workpiece mounted on the other end for engagement by a shaping tool whereby the template pattern is reproduced. However, such devices wherein the template is positioned remotely from the workpiece tend to require relatively large amounts of space for separating the template and the workpiece a required distance. Furthermore, remote tracing devices such as that shown in the Schell patent tend to be relatively complex and adapted for performing only very specific tasks. Thus, many shops, especially smaller ones where space is at a premium and tools must perform multiple functions, are unable to afford the cost of such an apparatus or the floor space occupied thereby.

As an alternative to such tracer-type systems, it is known to mount the workpiece directly on the template. The Heath U.S. Pat. No. 1,364,196 shows an apparatus for securing a propeller blank on top of a template so that a propeller may be formed on a table-mounted shaper. The Heath Patent shows smooth, non-rotating follower members for engaging the template mounted directly beneath the shaper blades. Such follower members are often referred to as "dead collars" and may be mounted above or below the shaper blade, depending upon the relative placement of the template and the workpiece.

An even simpler alternative than the Heath apparatus is to fasten the workpiece directly to the template with mechanical fasteners such as nails, screws and the like. However, such mechanical fasteners leave holes in the workpiece which may require filling prior to the application of a final finish.

Prior systems for directly attaching templates and workpieces may also be objectionable for safety reasons. First of all, with the template and workpiece mounted one on top of the other, the operator's hands may be exposed to the router or shaper blade in dangerously close proximity as the template and workpiece assemblage is guided therethrough. Secondly, the template and workpiece assemblage may be relatively light in weight and thus subject to being thrown into the operator by the rotational force of the shaper blade.

Heretofore, there has not been available a holder for templates and workpieces with the features and advantages of the present invention.

SUMMARY OF THE INVENTION

In the practice of the present invention, a template and workpiece holder is provided which includes a base with a plurality of transverse rails extending thereacross. A pair of clamp assemblies are slidably disposed on the base and their transverse movements are synchronized by a rack and pinion gear workpiece centering mechanism. The clamp assemblies include toggle clamps for clamping the workpiece between them. Lock handles are provided on the clamp assemblies for securing them in a fixed position with respect to the rails. A centering key extends from one of the rails and is received in a template centering slot in the template.

In a first modified embodiment of the present invention, a template and workpiece holder is provided which includes a base plate with a channel member mounted thereon. A rack and pinion gear mechanism is located in the channel member for centering a workpiece on the holder. A template is centered on the holder by a key and slot arrangement. Toggle clamps are mounted on the channel member for clamping the holder, template and workpiece together.

OBJECTS OF THE INVENTION

The principal objects of the present invention are: to provide a holder for templates and workpieces; to provide such a holder adapted for mounting a template and a workpiece one on top of the other; to provide such a holder which requires relatively little space; to provide such a holder which does not mar, scratch or otherwise damage the workpiece; to provide such a holder which is adapted for quickly and easily mounting and removing templates and workpieces; to provide such a holder which is adapted for automatically centering templates and workpieces thereon; to provide such a holder which provides a relatively heavy assemblage when combined with a template and a workpiece; to provide such a holder which is grasped by an operator well away from a portion of the workpiece to be cut; to provide such a holder which is relatively safe to use; to provide such a holder which is adapted to accommodate templates and workpieces of various sizes and configurations; and to provide such a holder which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a front elevation of the holder.

FIG. 5 is a cross section of the holder taken generally along line 5—5 of FIG. 3.

FIG. 6 is a cross section of the holder taken generally along line 6—6 in FIG. 3.

FIG. 7 is a perspective of a raised panel cabinet door.

FIG. 8 is a cross section of the cabinet door taken generally along line 8—8 in FIG. 7.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
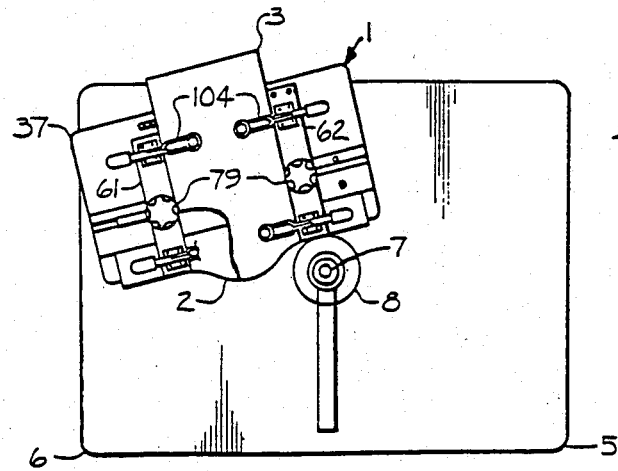
FIG. 1 is a perspective of a template and workpiece holder according to the present invention on a shaper.
Figure 2:
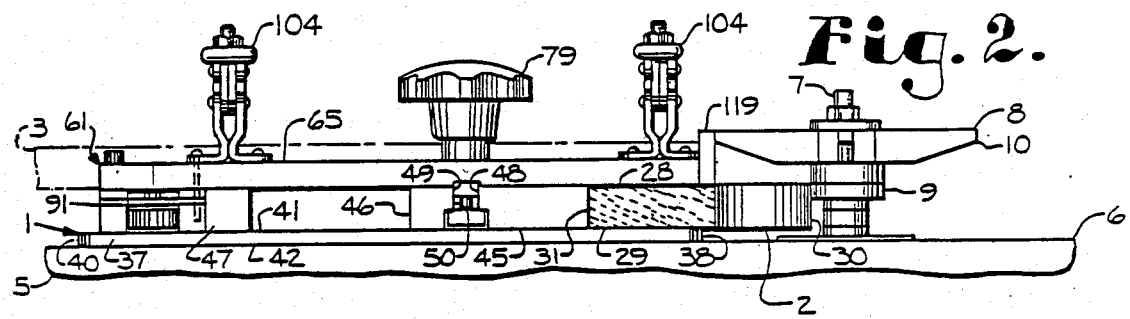
FIG. 2 is a side elevation of the template and workpiece holder.
Figure 3:
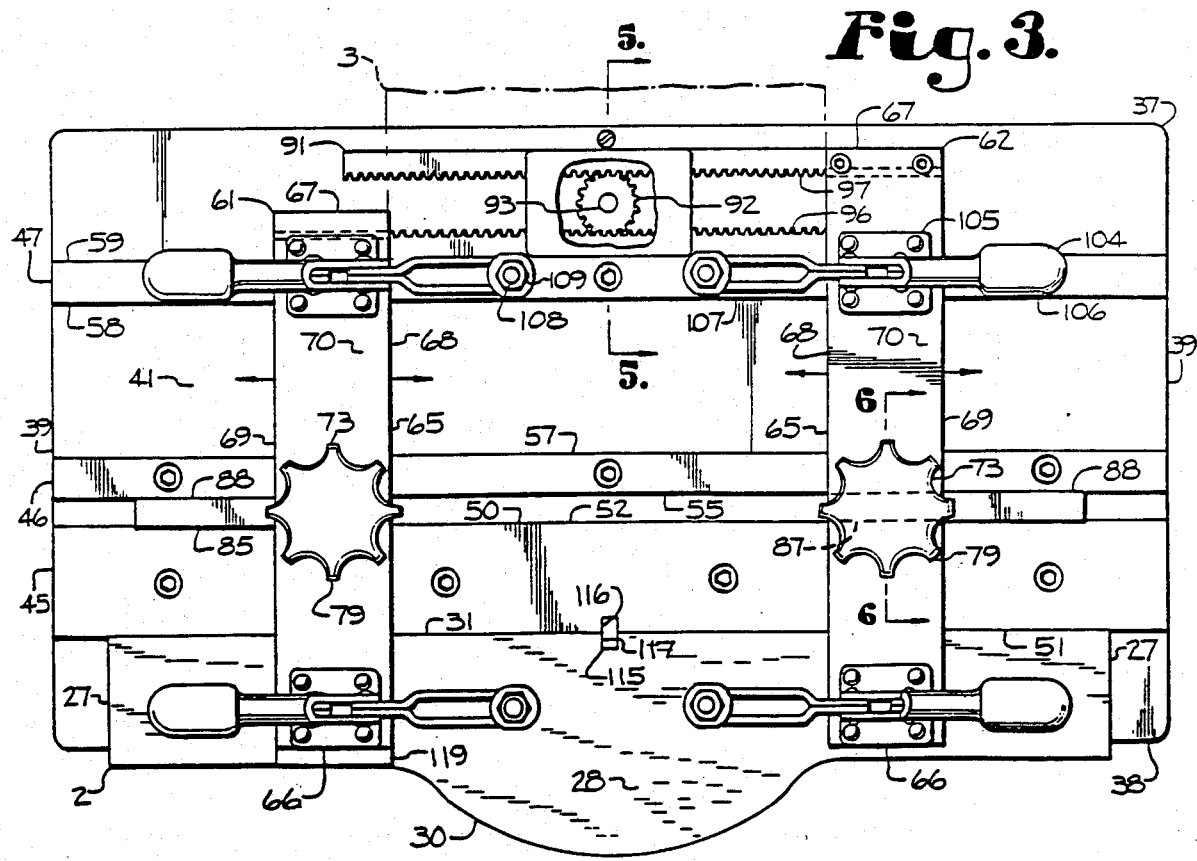
FIG. 3 is a top plan of the holder with portions broken away to reveal internal construction.
Figure 9:
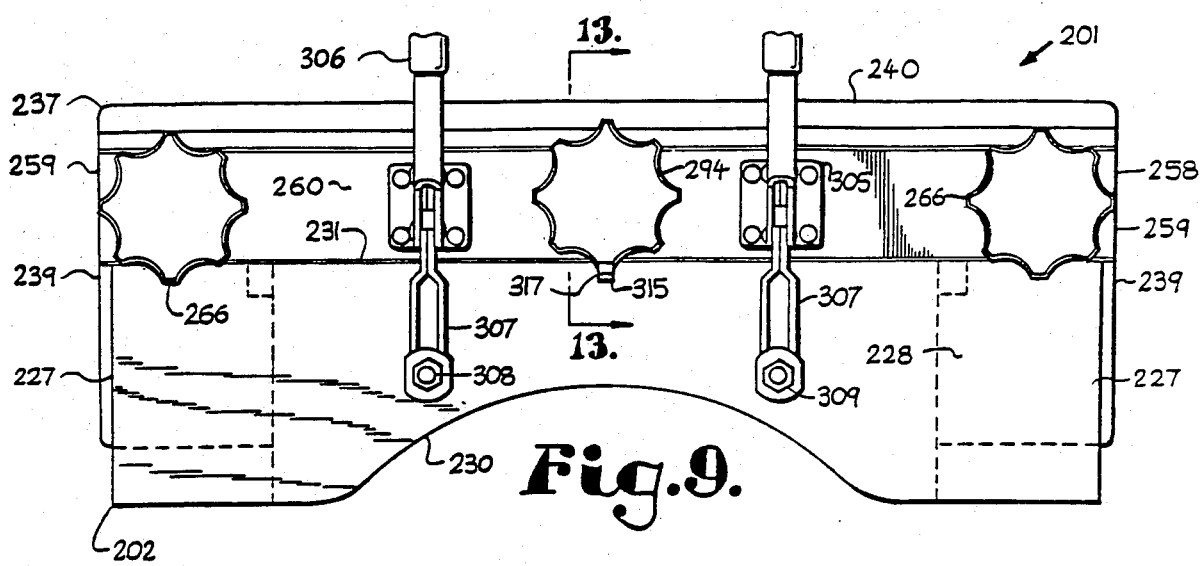
FIG. 9 is a top plan of a template and workpiece holder comprising a first modified embodiment of the present invention.
Figure 10:
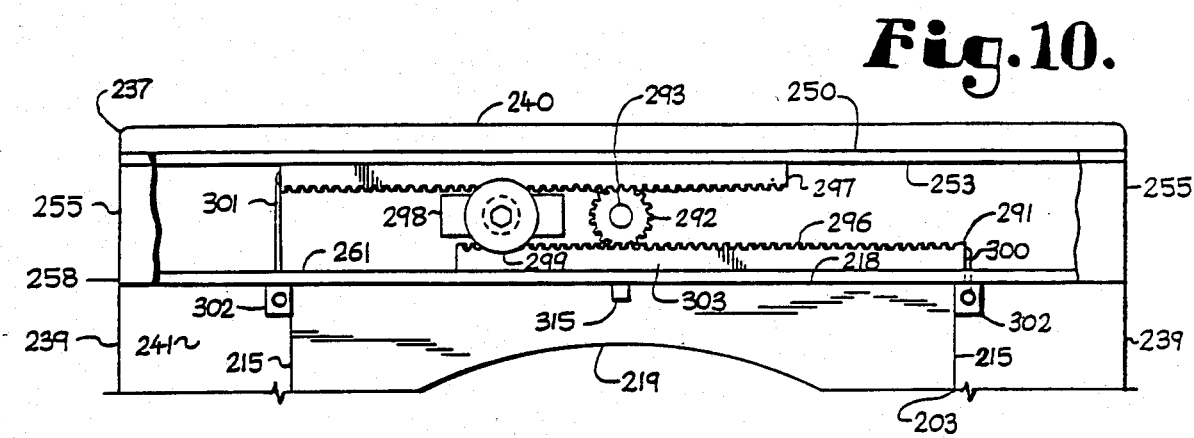
FIG. 10 is a horizontal section of the first modified holder.
Figure 11:
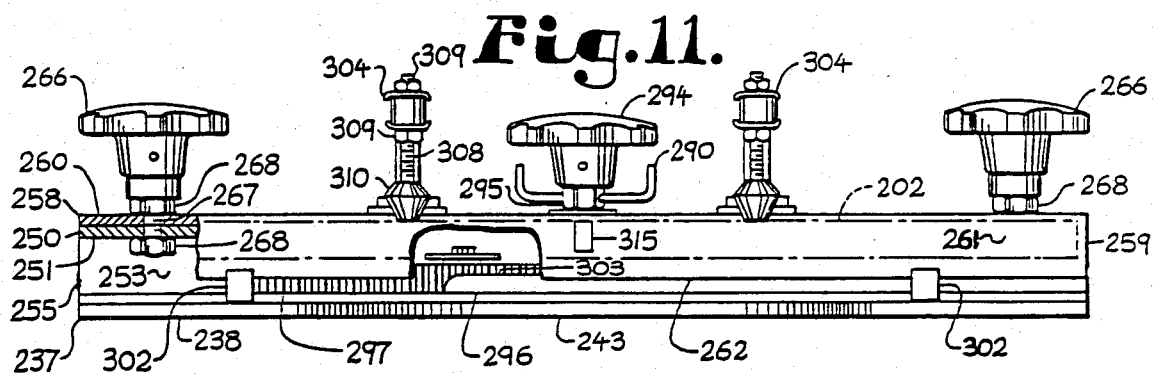
FIG. 11 is a front elevation of the first modified holder with portions removed to reveal internal construction.
Figure 12:
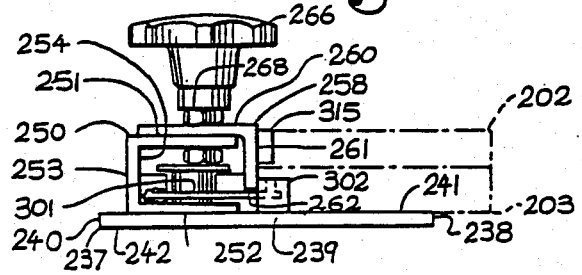
FIG. 12 is an end elevation of the first modified holder.
Figure 13:
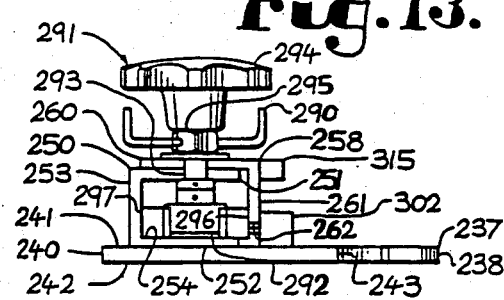
FIG. 13 is a cross section of the first modified holder taken generally along line 13—13 in FIG. 9.

The terms "left" and "right" refer to the primary embodiment of the present invention as oriented in FIG. 3 and to the first modified embodiment of the present invention as oriented in FIG. 9. However, such designations are for purposes of description and disclosure only, and the invention may assume alternative orientations and configurations.

Referring to the drawings in more detail, the reference numeral 1 generally designates a holder for a template 2 and a workpiece 3. The holder 1 is particularly designed for use on a shaper 5 including a table 6 and a spindle 7 rotatably driven by a shaper motor (not shown). A rotating shaper blade 8 with radially extending knives 10 is mounted on the spindle 7 and a "dead" collar 9 is bolted to the table and placed coaxially around the spindle 7. The diameter of the dead collar 9 is substantially equal to that of the shaper blade 8 so that the blade knives 10 form a cutting path in vertical alignment with the periphery of the collar 9. The collar 9 is shown under the blade 8 because the workpiece 3 is mounted on top of the template 2.

When finished, the workpiece 3 comprises a panel 16 for a raised panel cabinet door 17. The panel 16 has a curvilinear upper or "crown" edge 18 and a peripheral bevel 19 on its front face 20. The panel 16 is framed by crown, side and bottom rails 21, 22 and 23 respectively, the crown rail 21 having a curvilinear configuration matching that of the panel crown edge 18.

The panel template 2 includes opposite ends 27, upper and lower faces 28, 29 and crown and straight edges 30, 31. The template crown edge 30 corresponds in shape to the panel crown edge 18.

The holder 1 includes a base plate 37 with a front edge 38, opposite side edges 39, a back edge 40 and upper and lower surfaces 41, 42. Front, middle and back rails 45, 46 and 47 extend transversely across the plate upper surface 41 between the side edges 39. The front rail 45 displays front and back edges 51, 52 and the middle rail 46 displays front and back edges 55, 57. Flanges 48, 49 extend from the front rail back edge 52 and the middle rail front edge 55 respectively and form channels 53, 56 thereunder. A passageway 50 is formed between the front and middle rails 45, 46 and has an inverted T-shaped cross-sectional configuration with a lower portion 54 between and including the channels 53, 56 and an upper portion 60 between the flanges 48, 49. The back rail 47 displays front and back edges 58, 59.

Left and right holder assemblies 61, 62 are slidably mounted on the rails 45, 46 and 47. Each holder assembly 61, 62 includes a slide bar 65 with front and back ends 66, 67; inner and outer side edges 68, 69; and upper and lower faces 70, 71. Each holder assembly 61, 62 also includes a lock device 73 comprising a bolt 74 including a shank 75 slidably extending through a receiver 76 in a respective slide bar 75. The bolts 74 include square heads 77 slidably received in the opposing rail channels 56. Bushings 78 receive the lock bolts 74 in loose fitting, non-threaded engagements and are positioned between the slide bar upper faces 70 and a pair of lock handles 79 which threadably receive the lock bolts 74.

The slide bars 65 may be locked in position on the rails 45, 46 and 47 by tightening the lock handles 79 whereby the flanges 48, 49; the slide bars 65; and the bushings 78 are clamped between the bolt head 77 and the lock handles 79. The bolts 74 are prevented from rotating within the receivers 76 by their square heads 77 which are only slightly narrower than the passageway lower portion 54. Thus, the bolt heads 77 are slidably but not rotatably positioned within the passageway lower portion 54.

Each clamp assembly 61, 62 includes a transverse guide bar 85 secured in a respective guide bar slot 86 extending transversely across the lower face 71 of a respective slide bar 65 and opening downwardly into the passageway upper portion 60. The guide bar slots 86 intersect the lock bolt receivers 76. Each guide bar 85 includes an inner portion 87 terminating flush with a respective slide bar inside edge 68 and an outer portion 88 extending substantially outwardly beyond the slide bar outside edge 69, preferably at least a distance equal to the width of the slide bar 65. The guide bars 85 are partially slidably received within the passageway upper portion 60 and function to maintain the slide bars 65 in perpendicular relationship to the rails 45, 46 and 47 and in parallel relationship with respect to each other.

A rack and pinion centering mechanism 91 is provided behind the back rail 47 and includes a toothed pinion gear 92 rotatably mounted on the base plate 37 by a pinion gear bolt 93. The pinion gear 92 is located between the base plate back edge 40 and the back rail 47 approximately midway between the base plate side edges 39. A toothed front rack 96 is attached at its outer end to the left clamp assembly 61 at its slide bar back end 67. The front rack 96 meshes with the pinion gear 92 and slides along the back rail back edge 59. A back rack 97 is attached at its outer end to the right clamp assembly 62 at its slide bar back end 67. The back rack 97 also meshes with the pinion gear 92 and is retained by a retainer pin 98 screwed into the base plate 37 in proximity to its back edge 40. A gear cover plate 99 is placed over the pinion gear 92 and portions of the racks 96, 97 and is secured by the pinion gear bolt 93.

A pair of toggle clamps 104 are mounted on the slide bar 65 in proximity to the front and back ends 66, 67 thereof. Each toggle clamp 104 includes a base 105 mounted on a respective slide bar upper face 70, a handle 106 and a lever arm 107. A clamping bolt 108 is adjustably mounted on each lever arm 107 by a pair of clamping nuts 109. The clamping bolts 108 terminate at feet 110 comprising a resilient material which will not scratch or mar the workpiece 3, for example, rubber. The clamping bolts 108 are inwardly and outwardly movable along respective lever arms 107 and may be adjusted vertically by repositioning the clamping nuts 109.

A centering key 115 is attached to the front rail 45 partly within a centering key slot 116 and extends forwardly from the front rail front edge 51. The centering key 115 is partly received within a template centering slot 117 on the template straight edge 31. A wood anti-splintering block 119 is mounted on the front end 66 of the left clamp assembly 61.

In operation, a panel template 2 is selected with a crown edge 30 corresponding to the desired configuration of the resulting panel crown edge 18. Since cabinet doors vary in width, the proportions of their panel crown edges should correspondingly vary in width so that proportionality is maintained for a pleasing aesthetic appearance. A set of panel templates may all have the same width even though they are designed for panels 16 of varying widths because of the template-centering function of the panel holder 1.

The selected panel template 2 is placed with its lower face 29 on the base plate upper surface 41, its straight edge 31 against the front rail front edge 51 and the centering key 115 within the template centering slot 117. The transverse rails 45, 46 and 47 preferably have heights corresponding to the thickness of the template 2, for example, approximately ¾ of an inch. The panel blank or workpiece 3 is preferably cut to an approximation of its final shape prior to mounting in the panel holder 1. For example, the panel template 2 may be placed on a wood blank having the desired overall dimensions and a rough outline of the desired finished panel 16 traced onto the blank. A bandsaw or similar tool may be used to approximate the desired finished configuration in the panel blank 3.

With the toggle clamps 104 open and their lever arms 107 raised, the panel blank 3 is placed on top of the rails 45, 46 and 47 and the panel template 2. The panel blank crown edge 18 preferably slightly overhangs the template crown edge 30. The panel blank 16 should be positioned so that its crown edge 18 completely covers the template crown edge 30. With the lock handles 79 loosened, the clamp assemblies 61 and 62 are pushed inwardly until their slide bar inside edges 68 engage the panel side edges 15 and the lock handles 79 are tightened. The rack and pinion centering mechanism 91 maintains the slide bars 65 in equidistant spacing from a front-to-back centerline of the panel holder 1 whereby the panel blank 3 is centered over the panel template 2. The toggle clamp handles 106 are then pushed downwardly whereby the panel blank 3 is securely clamped to the holder 1 by the resilient toggle clamp feet 110.

The operator grasps the lock handles 79 with both hands and places the holder 1 on the shaper table 6. The template 27 engages the dead collar 9, preferably starting at the template right end. As the template crown edge 30 slides along the dead collar 9, the panel blank 3 is fed to the shaper blade 8. When the cut is finished on the left side of the panel blank 3, the anti-splintering block 119 prevents the corner of the panel blank 3 from splintering. The toggle clamps 104 are then released by raising their handles 106 and the panel blank 3 may be removed from the holder 1. The next panel blank may be positioned and clamped on the holder 1 following the procedures set forth above.

Set up time is minimized by the use of the holder 1 because the panel template 2 and the panel blank 3 are automatically centered. Also, the use of toggle clamps 104 eliminates the need for attaching the panel blank 3 to the template 2 by nails, screws or the like. Safety is enhanced because the weight of the holder 1 tends to reduce the risk of the assemblage being hurled by the shaper blade 8 against the operator. Furthermore, the holder 1 is designed to be difficult to effectively manipulate without holding it by the lock handles 79 with both hands, which are thereby kept well away from the shaper blade 8.

A rail holder 201 comprising a first modified embodiment of the present invention is shown in FIGS. 9 through 13 and generally designated by the reference numeral 201. The rail holder 201 is adapted to hold a crown rail template 202 and a workpiece comprising a crown rail blank 203. The assemblage comprising the above components is adapted for placement on the shaper 5 for forming the finished crown rail 21. The template 202 is located above the blank 203 in the holder 201. Accordingly, a dead collar is mounted on the shaper 5 over the shaper blade 8 for engagement with the template 202 whereby the shaper blade 8 is guided through the blank 203 to form the finished crown rail 21.

The template 202 includes opposite ends 227, upper and lower faces 228, 229 and a back straight edge 231. A curvilinear crown edge 230 is provided with a configuration corresponding to that of the crown edge 219 in the finished crown rail 21. The finished crown rail 21 includes opposite ends 215; front and back faces 216, 217; an upper straight edge 218; and a curvilinear, lower crown edge 219 with a configuration corresponding to that of the panel crown edge 18. The lower crown edge 219 has a groove or dado 226 adapted to receive the panel crown edge 18.

The crown rail holder 201 includes a base plate 237 with front, side and back edges 238, 239 and 240 and upper and lower surfaces 241, 242. The base plate front edge 238 includes a rearwardly convex deflection 243 for accommodating the shaper blade 8 when it forms the crown edge 219 of the rail blank 203. A channel member 250 is mounted on the base plate upper surface 241 and extends transversely between its side edges 239 in slightly spaced relation in front of the base plate back edge 240. The channel member 250 includes top and bottom legs 251 and 252 interconnected by a back leg 253 and forming a transverse channel 254 therebetween. The channel member 250 includes opposite ends 255.

A transverse angle member 258 includes opposite ends 259, a top flange 260 mounted on the channel member top leg 251 and a front flange 261 with a lower edge 262 above the channel member bottom leg 252. A pair of handles 266 are mounted on top of the angle member top flange 260 by threaded rods 267 extending through the angle member top flange 260 and the channel member top leg 251 and receiving nuts 268.

A rack and pinion-type centering mechanism 291 includes a pinion gear 292 mounted on a pinion gear shaft 293 threaded at its upper end and rotatable by a centering knob 294. A centering mechanism lock nut 295 is provided with diametrically opposed levers 290. Front and back racks 296, 297 are slidably disposed in the channel 254 and mesh with the pinion gear 292. A pinion gear spacer 298 is mounted on the channel member bottom leg 252 to the left of the pinion gear shaft 293. A rack retainer 299 is mounted on top of the rack spacer 298 for holding the racks 296, 297 in engagement with the pinion gear 292. Right and left centering pins 300, 301 extend forwardly from the front and back racks 296, 297 and terminate at cube-shaped centering pin ends 302. The front rack 296 is notched at 303 to allow the left centering pin 301 to slide thereunder as the racks 296, 297 reciprocate.

A pair of toggle clamps 304 are located between the centering knob 294 and the handles 266. Each toggle clamp 304 includes a base 305 mounted on the angle member top flange 260, a handle 306 and a lever arm 307. A clamping bolt 308 is adjustably mounted on each lever arm 307 by clamping nuts 309. Each clamping bolt 308 terminates at a resilient, rubber foot 310.

A centering key 315 is affixed to and extends forwardly from the angle member front flange 261 substantially midway between the angle member ends 259 in alignment with the centering handle 294. The template 202 is provided with a template centering slot 317 on its back straight edge 231. The template centering slot 317 is adapted to receive the centering key 315.

In operation, the crown rail blank 203 is cut to the general configuration of the finished crown rail 25 with a slight overlap for the crown edge 219. The crown rail blank 203 is then positioned on the holder 201 with its back face 217 down against the base plate upper surface 241 and its upper straight edge 231 placed against the angle member front flange 261. The centering handle 294 is turned clockwise to draw the centering pins 300, 301 inwardly until their ends 302 engage the crown rail ends 215. The lock nut 295 is then tightened and the crown rail blank 203 is centered and properly located on the holder 201.

Next, the crown rail template 202 is placed on the holder 201 with its lower face 229 on top of the crown rail blank front face 216 and its back edge 231 against the angle member front flange 261. The template centering slot 217 receives the centering key 315 whereby the template 202 is centered on the holder 201 and properly positioned with respect to the crown rail blank 203. The crown edges 219, 230 of the crown rail blank 203 and the template 202 are positioned over and approximately aligned with the convex deflection 243 in the base plate front edge 238. Thus, the crown rail and template crown edges 219 and 230 are exposed to the shaper blade 8 along their entire lengths.

The toggle clamp handles 306 are depressed whereby their feet 310 resiliently engage the template upper face 228 and the entire assemblage is clamped together. The assemblage is then placed on the shaper table and the shaper blade forms the crown edge 219 of the finished crown rail 21, guided by the dead collar engaging the template crown edge 230. Preferably the shaper blade cuts the dado 226 in the crown rail crown edge 219 simultaneously with cutting it to its finished configuration.

The finished crown rail 21 and the crown rail template 202 are easily removed from the holder 201 by releasing the toggle clamps 304. Set up is facilitated with the holder 201 because of the centering mechanism 291 which rapidly and accurately positions the template 202. The holder 201 can accommodate rail blanks with various widths up to a maximum width corresponding to the spacing between the centering pin ends 302 in their outermost positions. A variety of templates such as that shown at 202 may have the same widths, regardless of the desired widths of the crown rail blanks for which they are used, because the templates are centered by the centering key 315.

It is to be understood that while certain forms of the present invention have been illustrated and described herein, it is not to be limited to the specific forms or arrangement of parts described and shown.

What is claimed and desired to be secured by Letters Patent is as follows:

1. A template and workpiece holder, which comprises:
    (a) template centering means adapted for centering a template in a predetermined position on the holder;
    (b) workpiece centering means adapted for centering a workpiece in a predetermined position on the holder and comprising a pair of clamp assemblies transversely slidable with respect to the holder and adapted for centering the workpiece therebetween;
    (c) a base plate mounting said template and workpiece centering means;
    (d) said clamp assemblies being connected to said base plate and including clamps adapted for clamping the template and workpiece on the holder above the base plate with one of said template and holder overlying the other; and
    (e) handle means connected to said base plate for manipulating said holder.

2. The holder according to claim 1, which includes:
    (a) a rail extending transversely aross said base plate; and
    (b) said clamping assemblies being transversely slidably mounted on said rail.

3. The holder according to claim 1, which includes:
    (a) said workpiece centering means including a rack and pinion gear engaging said clamp assemblies and adapted for synchronizing the transverse sliding movements thereof.

4. A template and workpiece holder, which comprises:
    (a) template locating menas adapted for locating a template in a predetermined position and orientation on the holder;
    (b) workpiece locating means adapted for locating a workpiece in a predetermined position and orientation on the holder;
    (c) a base plate mounting said template and workpiece locating means;
    (d) clamp means connected to said base plate and adapted for clamping the template and the workpiece to the holder above the base plate with one of said template and holder overlying the other; and
    (e) handle means connected to said base plate for manipulating said holder.

5. The holder according to claim 4 which includes:
    (a) a channel member extending transversely across the base plate; and
    (b) said workpiece centering means comprising a rack and pinion mechanism positioned within said channel.

6. A template and workpiece holder, which comprises:
(a) a base plate including:
  (1) front and back edges;
  (2) opposite side edges; and
  (3) upper and lower surfaces;
(b) a rail mounted on said base plate upper surface and extending transversely between its opposite side edges;
(c) left and right clamp assemblies each transversely slidably disposed on said rail and including:
  (1) guide means for guiding the movement of said clamp assembly on said rail; and
  (2) clamp means for clamping the template to the holder above the base plate and the workpiece on top of the template;
(d) template centering means mounted on said base plate and adapted for centering the template on the base plate; and
(e) workpiece centering means connected to said clamp assemblies and adapted for synchronizing the transverse sliding movements thereof and centering the workpiece on the base plate.

7. The holder according to claim 6, which includes:
(a) said transverse rail comprising a first rail;
(b) a second transverse rail positioned behind and parallel to said first rail; and
(c) said guide means comprising a pair of guide bars each mounted on a respective clamp assembly and slidably received between said rails.

8. The holder according to claim 6, which includes:
(a) said workpiece centering means comprising a rack and pinion gear with a pair of racks each attached to a respective clamp assembly and a pinion gear intermeshing with said racks, said pinion gear being rotatably mounted on said base plate.

9. The holder according to claim 6, which includes:
(a) lock means for locking said clamp assemblies in predetermined positions on said rail.

10. The holder according to claim 6 which includes:
(a) said clamp means comprising a pair of toggle clamps, each said toggle clamp including:
  (1) a handle extending outwardly from said clamp assembly;
  (2) a lever arm extending inwardly from said clamp assembly; and
  (3) a resilient foot extending downwardly from said lever arm and adapted for engaging the workpiece.

11. A template and workpiece holder, which comprises:
(a) a base plate including:
  (1) front and back edges;
  (2) opposite side edges; and
  (3) upper and lower surfaces;
(b) a rail mounted on said base plate upper surface and extending transversely between its opposite side edges;
(c) left and right clamp assemblies each transversely slidably disposed on said rail and including:
  (1) guide means for guiding the movement of said clamp assembly on said rail; and
  (2) clamp means for clamping a template and a workpiece on the holder between the clamp assemblies;
(d) template centering means mounted on said base plate and adapted for centering the template on the base plate;
(e) workpiece centering means mounted on said base plate and connected to said clamp assemblies and adapted for synchronizing the transverse sliding movements thereof and centering the workpiece on the base plate;
(f) lock means for locking said clamp assemblies in predetermined positions on said rail;
(g) said transverse bar comprising a first bar;
(h) a second transverse bar positioned behind and parallel to said first transverse bar;
(i) said transverse bars including respective channels open in opposing relationship and forming a passageway therebetween;
(j) said lock means including a pair of lock bolts each extending through a respective clamp assembly and having a head slidably received within said passageway; and
(k) a pair of lock nut means each threadably received on a respective lock bolt.

12. The holder according to claim 11 which includes:
(a) said lock nut means comprising a pair of locking handles adapted for grasping by an operator of the holder.

13. A holder for a panel template and a panel blank, which comprises:
(a) a base plate including front, side and back edges and upper and lower surfaces;
(b) front, middle and back rails mounted on said base plate upper surface and extending transversely thereacross between said base plate side edges in parallel relationship, each said rail including front and back edges;
(c) said front rail having a flange extending rearwardly from its back edge and forming a front rail channel thereunder;
(d) said middle rail having a flange extending forwardly from its front edge and forming a middle rail channel thereunder;
(e) a passageway formed between said front and middle rails, said passageway including a wide lower portion at said rail channels and a narrow upper portion between said flanges;
(f) left and right clamp assemblies, each said clamp assembly including:
  (1) a slide bar with front and back ends, inside and outside edges and upper and lower faces;
  (2) a lock device including a bolt extending through said slide bar and having a head slidably received in said passageway lower portion and a lock handle threadably receiving said bolt and adapted for locking said clamp assembly to said rails; and
  (3) a guide bar mounted on said slide bar lower face and slidably received in said passageway upper portion;
(g) a centering mechanism including:
  (1) a pinion gear rotatably mounted on said base plate; and
  (2) front and back racks each attached to one of said slide bars and extending transversely with respect to said base plate, each said rack intermeshing with said pinion gear;
(h) said clamp assemblies being slidable inwardly and outwardly in a transverse direction with respect to said base plate, said centering mechanism synchronizing the movements of said clamp assemblies whereby said clamp assemblies are moved simultaneously and in equal amounts inwardly and outwardly; and (i) a pair of toggle clamps each mounted on a respective slide bar upper face and including lever arms extending inwardly from said slide bars and having feet mounted thereon;

(j) the holder being adapted to receive the template on the base plate upper surface against the front rail front edge;

(k) the holder being adapted to receive the workpiece on top of the rails and the template with the workpiece centered between the clamp assembly slide bars.

14. A holder for a template and a workpiece, which comprises:
    (a) a base plate having front, side and back edges and upper and lower surfaces;
    (b) a channel member including opposite ends and top, bottom and back legs forming a channel;
    (c) an angle member having opposite ends and top and front flanges, said top flange being mounted on said channel member top leg;
    (d) a workpiece centering mechanism including:
        (1) a pinion gear rotatably mounted within said channel;
        (2) a centering handle operably connected to said pinion gear and located above said angle member top flange;
        (3) front and back racks intermeshing with said pinion gear and reciprocably disposed within said channel; and
        (4) left and right centering pins each extending from one of said racks and protruding forwardly from said channel and said angle member front flange;
    (e) a pair of toggle clamps mounted on said angle member top flange and including lever arms extending forwardly from said angle member and having feet mounted thereon, said clamps being adapted for clamping the template and the workpiece on the holder; and
    (f) template centering means adapted for centering the template in a predetermined position on the holder.

15. A holder for a template and a workpiece, which comprises:
    (a) a base plate having front, side and back edges and upper and lower surfaces, said front edge having a convex deflection;
    (b) a channel member including top, bottom and back legs forming a channel and opposite ends;
    (c) an angle member having top and front flanges and opposite ends, said angle member top flange being mounted on said channel member top leg and said angle member front flange terminating at a lower edge positioned above said channel member bottom leg;
    (d) a pair of handles mounted on said angle member top flange;
    (e) a centering mechanism including:
        (1) a pinion gear mounted on a pinion gear shaft extending through said channel member top leg and said angle member top flange;
        (2) a centering handle mounted on said pinion gear shaft above said angle member top flange;
        (3) a lock nut threadably receiving said pinion gear shaft between said angle member top flange and said centering handle, said lock nut being adapted for locking said pinion gear shaft against rotation;
        (4) front and back racks intermeshing with said pinion gear and reciprocably disposed within said channel; and
        (5) left and right centering pins each extending from one of said racks and protruding forwardly from between said channel member bottom leg and said angle member front flange lower edge;
    (f) a pair of toggle clamps mounted on said angle member top flange and including lever arms extending forwardly from said angle member and having feet mounted thereon; and
    (g) a centering key projecting forwardly from said angle member front flange;
    (h) said holder being adapted to receive a workpiece on said base plate upper surface with ends of the workpiece being engaged by said centering pins whereby the workpiece is centered on the holder;
    (i) the holder being adapted for placement of the template on top of the workpiece with a back edge thereof positioned against said angle member front flange and a template centering slot receiving said centering key;
    (j) the workpiece and the template being adapted for clamping to said holder by said toggle clamps.

16. A template and workpiece holder, which comprises:
    (a) workpiece centering means adapted for centering a workpiece in a predetermined position on the holder;
    (b) clamp means connected to said workpiece centering means and adapted for clamping a template and the workpiece to the holder;
    (c) a template centering key extending laterally from one of the holder and the template; and
    (d) a template centering slot open laterally at the other of the holder and the template, the template centering slot being adapted to receive the template centering key with the template centered on the holder.

* * * * *